(12) United States Patent
Hwang et al.

(10) Patent No.: US 6,975,450 B2
(45) Date of Patent: *Dec. 13, 2005

(54) WIDE BAND ERBIUM-DOPED FIBER AMPLIFIER WITH GAIN ENHANCEMENT

(75) Inventors: Seong-Taek Hwang, Pyongtaek-shi (KR); Kwan-Woong Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 251 days.

This patent is subject to a terminal disclaimer.

(21) Appl. No.: 10/294,861

(22) Filed: Nov. 14, 2002

(65) Prior Publication Data

US 2003/0206334 A1 Nov. 6, 2003

(30) Foreign Application Priority Data

Mar. 5, 2002 (KR) ............................... 2002-11514

(51) Int. Cl.[7] .............................................. H01S 3/00
(52) U.S. Cl. ................................................... 359/349
(58) Field of Search ........................... 359/341.41, 349

(56) References Cited

U.S. PATENT DOCUMENTS

| | | | |
|---|---|---|---|
| 5,867,306 A * | 2/1999 | Isshiki ..................... | 359/337.1 |
| 6,049,417 A * | 4/2000 | Srivastava et al. ........ | 359/337.4 |
| 6,049,418 A * | 4/2000 | Srivastava et al. ........ | 359/337.4 |
| 6,259,556 B1 * | 7/2001 | Lutz et al. ................ | 359/337.1 |
| 6,288,834 B1 | 9/2001 | Sugaya et al. ............ | 359/341.1 |
| 6,307,668 B1 * | 10/2001 | Bastien et al. ............ | 359/337.1 |
| 6,317,254 B1 * | 11/2001 | Park et al. ............. | 359/337.13 |
| 6,437,907 B1 * | 8/2002 | Yoon et al. ............. | 359/341.32 |
| 6,480,328 B2 * | 11/2002 | Shimojoh ................. | 359/341.1 |

(Continued)

FOREIGN PATENT DOCUMENTS

EP        1075095 A2   2/2001   .......... H04B 10/17

(Continued)

OTHER PUBLICATIONS

"The Novel Structure of C Plus L-Band Erbium-Doped Fiber Amplifier;" S.T. Hwang et al.; Proceedings from the 27th European Conference on Optical Communication, vol. 3; Oct. 4, 2001; XP002314855; 2 pgs.

(Continued)

*Primary Examiner*—Jack Keith
*Assistant Examiner*—Eric Bolda
(74) *Attorney, Agent, or Firm*—Cha & Reiter, LLC (57) ABSTRACT

A wide band erbium-doped fiber amplifier with a gain enhancement is provided comprising a first fiber amplifier adapted to amplify C-band components of an input optical signal, a second fiber amplifier connected to the first fiber amplifier in series while being disposed downstream from the first fiber amplifier to amplify L-band components of the input optical signal. A C/L splitter is disposed between the first and second fiber amplifiers and to split the amplified C and L-band optical signals to flow along different paths. A fiber reflector is disposed downstream from the second fiber amplifier to reflect the amplified L-band optical signal to flow backwards toward the second fiber amplifier. A circulator is disposed between the C/L splitter and the second fiber amplifier to guide the amplified L-band optical signal, reflected to flow backwards by the fiber reflector, so that the amplified L-band optical signal flows along a path different from that of optical signals applied to the circulator. A C/L combiner combines the amplified C-band optical signal split by the C/L splitter with the amplified L-band optical signal guided by the circulator, and applies the resultant optical signal to an output stage.

11 Claims, 8 Drawing Sheets

U.S. PATENT DOCUMENTS

| | | | |
|---|---|---|---|
| 6,621,627 B2 * | 9/2003 | Willner et al. | 359/349 |
| 6,646,796 B2 * | 11/2003 | Song et al. | 359/349 |
| 6,674,570 B2 * | 1/2004 | Song et al. | 359/349 |
| 6,867,912 B2 * | 3/2005 | Hwang et al. | 359/349 |
| 2002/0167722 A1 * | 11/2002 | Willner et al. | 359/349 |
| 2002/0181090 A1 * | 12/2002 | Song et al. | 359/349 |
| 2002/0181091 A1 * | 12/2002 | Song et al. | 359/349 |
| 2003/0133183 A1 * | 7/2003 | Yeniay et al. | 359/349 |
| 2004/0233516 A1 * | 11/2004 | Hwang et al. | 359/349 |
| 2004/0233517 A1 * | 11/2004 | Song et al. | 359/349 |
| 2004/0240045 A1 * | 12/2004 | Lee et al. | 359/349 |

FOREIGN PATENT DOCUMENTS

| | | | |
|---|---|---|---|
| JP | 2001044545 | 2/2001 | H01S 3/10 |

OTHER PUBLICATIONS

"L-Band EDFA Gain and Gain Flatness Enhancement Via Co-Propagating C-Band See Technique;" Aydin Yeniay et al.; Proceedings from the 27$^{th}$ European Conference on Optical Communication, vol. 2; Oct. 4, 2001; XP002314856; 2 pgs.

"Comparative High Power Conversion Efficiency of C-Plus L-Band EDFA;" Seongtaek Hwang et al.; Electronics Letters IEE UK, vol. 37, No. 25; Dec. 6, 2001; XP002314857; 3 pgs.

* cited by examiner

WIDE BAND ERBIUM-DOPED FIBER AMPLIFIER WITH GAIN ENHANCEMENT

CLAIM OF PRIORITY

This application makes reference to, incorporates the same herein, and claims all benefits accruing under 35 U.S.C. § 119 arising from an application entitled, "WIDE BAND ERBIUM-DOPED FIBER AMPLIFIER WITH GAIN ENHANCEMENT" filed earlier in the Korean Industrial Property Office on Mar. 5, 2002 and there duly assigned Serial No. 2002-11514.

BACKGROUND OF THE INVENTION

1. Field of the Invention

The present invention relates to an erbium-doped fiber amplifier used in a wavelength division multiplexing (WDM) optical communication system for transmission of optical signals to amplify an input optical signal, and in particular to a wide band erbium-doped fiber amplifier with a gain enhancement.

2. Description of the Related Art

Wavelength division multiplexing (WDM) optical transmission systems are responding to substantial increases in the amount of data transmitted by expanding their transmission bandwidth range. Research efforts involving wide band systems have focused on using both the C-band (Conventional band) and the L-band (Long band). For an optical fiber amplifier adapted to perform an amplification function for optical signals in optical transmission systems, an optical fiber amplifier doped with a rare-earth element, for example, erbium, is widely used. Such an erbium-doped fiber amplifier has a bandwidth limited to about 30 nm for each of the C-band and L-band. Raman amplifiers or tellulite-based erbium-doped fiber amplifiers have a wide amplification bandwidth capable of amplifying both the C-band and the L-band. However, Raman amplifiers have a limited utility because they require a high pumping power and, tellulite-based erbium-doped fiber amplifiers are based on techniques which have not been thoroughly proven. For such tellulite-based erbium-doped fiber amplifiers, research efforts are ongoing.

Figure 1:
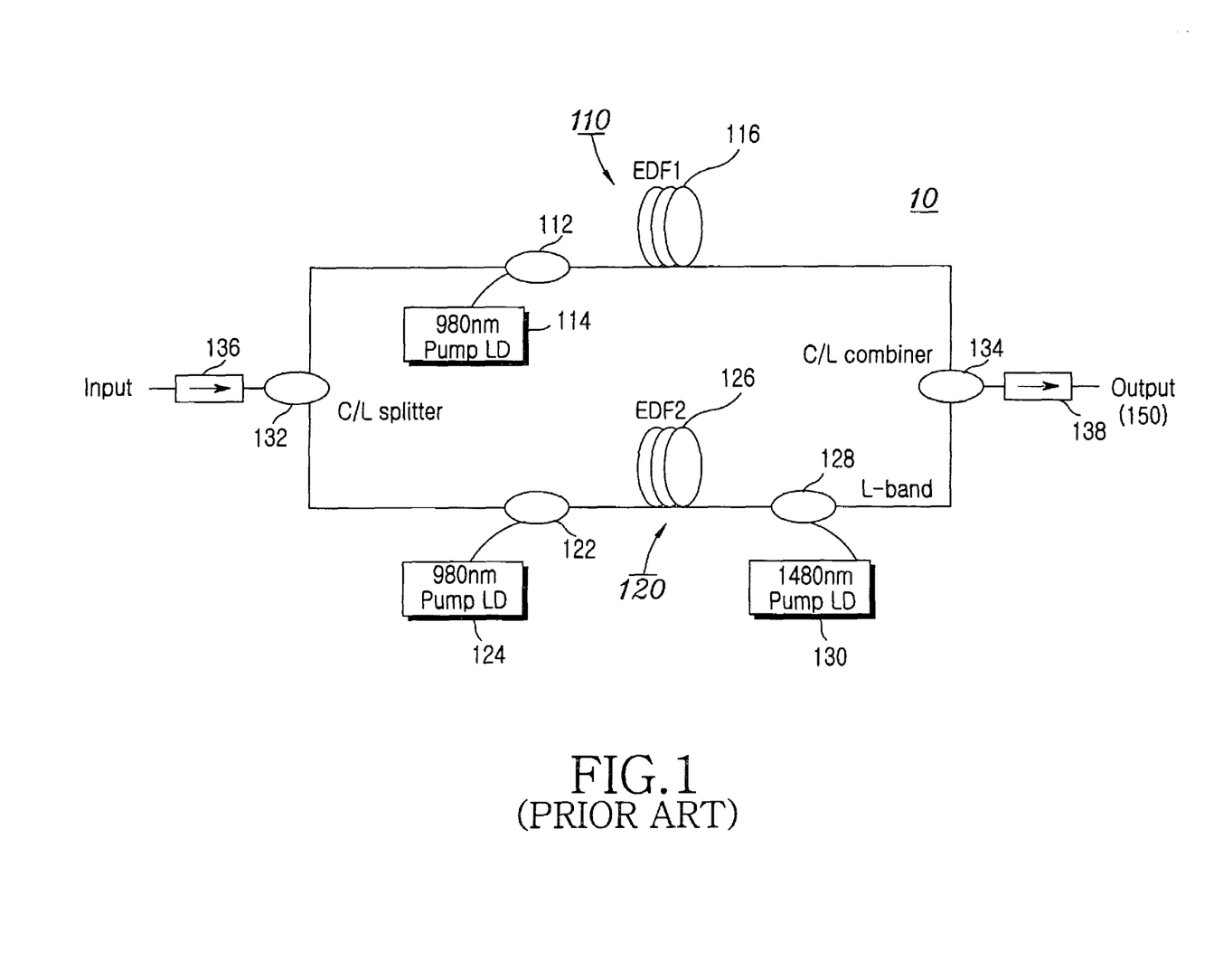
FIG. 1 illustrates the configuration of a prior art wide band erbium-doped fiber amplifier.

Current research is being done to develop a wide band erbium-doped fiber amplifier capable of amplifying both the C-band and the L-band by use of a conventional silica-based erbium-doped fiber amplifier. However, most wide band erbium-doped fiber amplifiers have a configuration in which independent C and L-bands are coupled in parallel. FIG. 1 illustrates the configuration of such a prior art wide band erbium-doped fiber amplifier.

As shown in FIG. 1, a typical prior art wide band erbium-doped fiber amplifier includes a first and second parallel-connected fiber amplifier 110 and 120 for amplifying optical signals of the C-band and L-band, respectively. The first fiber amplifier 110 comprises a first erbium-doped fiber (EDF1) 116 adapted to amplify an input optical signal by a pumping light supplied from a 980 nm pumping laser diode 114 connected to the first erbium-doped fiber 116 via a first wavelength selective coupler (WSC) 112. The second fiber amplifier 120 comprises a second erbium-doped fiber (EDF2) 126 adapted to amplify an input optical signal by a pumping light supplied from a forward 980 nm pumping laser diode 124 connected to the second erbium-doped fiber 126 via a second wavelength selective coupler 122, and a pumping light supplied from a backward 1,480 nm pumping laser diode 130 connected to the second erbium-doped fiber 126 via a third wavelength selective coupler 128.

The first erbium-doped fiber 116 amplifies C-band optical signals by a pumping light supplied thereto, whereas the second erbium-doped fiber 126 amplifies L-band optical signals by pumping lights supplied thereto. Upstream from the erbium-doped fibers 116 and 126, a C/L splitter is disposed to split an input optical signal into C and L-band optical signals. Downstream from the erbium-doped fibers 116 and 126, a C/L combiner 134 is disposed to combine the amplified C and L-band optical signals respectively outputted from the erbium-doped fibers 116 and 126. First and second isolators 136 and 138 are also disposed downstream from an input stage, and upstream from an output stage 150, respectively, in order to cut off backward flowing of an amplified spontaneous emission (ASE). The C-band optical signal split by the C/L splitter 132 is subjected to an amplification while passing through the first erbium-doped fiber 116. The amplification is carried out in accordance with an induced emission of excited erbium ions. That is, the erbium ions maintained in a ground state in the first erbium-doped fiber 116 are excited by the pumping light. The excited erbium ions are induced to be emitted, thereby amplifying the C-band optical signal passing through the first erbium-doped fiber 116. Similarly, the L-band optical signal split by the C/L splitter 132 is amplified while passing through the second erbium-doped optical fiber 126.

As discussed above, a typical prior art wide band erbium-doped fiber amplifier is configured by individually preparing C and L-band erbium-doped fiber amplifiers, and connecting those C and L-band erbium-doped fiber amplifiers in parallel. For this reason, a large number of optical elements are required. That is, the prior art wide band fiber amplifier has a disadvantage in terms of the manufacturing cost and decreased reliability due to the number of components involved. Furthermore, an increase in noise occurs in the fiber amplifier because the C/L splitter exhibiting a high insertion loss of about 0.7 dB is disposed upstream from the first and second erbium-doped fibers 116 and 126, each of which is a gain medium.

SUMMARY OF THE INVENTION

Thus, there is a need for a wide band erbium-doped fiber amplifier with a gain enhancement which does not require an increase number of components.

In a first embodiment, the present invention is a wide band erbium-doped fiber amplifier with a gain enhancement comprising a first fiber amplifier to amplify C-band components of an input optical signal and a second fiber amplifier connected to the first fiber amplifier in series while being disposed downstream from the first fiber amplifier to amplify L-band components of the input optical signal. A C/L splitter is disposed between the first and second fiber amplifier to split the amplified C and L-band optical signals to flow along different paths. A fiber reflector is disposed downstream from the second fiber amplifier to reflect the amplified L-band optical signal to flow backwards toward the second fiber amplifier. A circulator is disposed between the C/L splitter and the second fiber amplifier to guide the amplified L-band optical signal, reflected to flow backwards by the fiber reflector, so that the amplified L-band optical signal flows along a path different from that of optical signals applied to the circulator. C/L combiner combines the amplified C-band optical signal split by the C/L splitter with the amplified L-band optical signal guided by the circulator and applies the resultant optical signal to an output stage.

In a second embodiment, the present invention provides a wide band erbium-doped fiber amplifier with a gain enhancement comprising a first fiber amplifier adapted to amplify C-band components of an input optical signal and a second fiber amplifier connected to the first fiber amplifier in series while being disposed downstream from the first fiber amplifier and adapted to amplify L-band components of the input optical signal. A C/L splitter is disposed between the first and second fiber amplifiers and to split the amplified C and L-band optical signals to flow along different paths. A fiber reflector is disposed downstream from the second fiber amplifier to reflect the amplified L-band optical signal to flow backwards toward the second fiber amplifier. A circulator is disposed between the C/L splitter and the second fiber amplifier to guide the amplified L-band optical signal, reflected to flow backwards by the fiber reflector, so that the amplified L-band optical signal flows along a path different from that of optical signals applied to the circulator. A C/L combiner combines the amplified C-band optical signal split by the C/L splitter with the amplified L-band optical signal guided by the circulator and to apply the resultant optical signal to an output stage. Re-using means for supplying a part of the amplified C-band optical signal split by the C/L splitter as a seed beam for the second fiber amplifier are provided, preferably a 10% coupler.

In a third embodiment, the present invention provides a wide band erbium-doped fiber amplifier with a gain enhancement comprising a first fiber amplifier to amplify C-band components of an input optical signal and a second fiber amplifier connected to the first fiber amplifier in series while being disposed downstream from the first fiber amplifier to amplify L-band components of the input optical signal. A C/L splitter is disposed between the first and second fiber amplifiers and adapted to split the amplified C and L-band optical signals to flow along different paths. A fiber reflector is disposed downstream from the second fiber amplifier to reflect the amplified L-band optical signal to flow backwards toward the second fiber amplifier. A circulator is disposed upstream from the first fiber amplifier to guide the amplified L-band optical signal, reflected to flow backwards by the fiber reflector, so that the amplified L-band optical signal flows along a path different from that of optical signals applied to the circulator. A C/L combiner combines the amplified C-band optical signal split by the C/L splitter with the amplified L-band optical signal guided by the circulator. Re-using means for supplying a part of the amplified C-band optical signal split by the C/L splitter as a seed beam for the second fiber amplifier are provided, preferably a 10% coupler.

In a fourth embodiment, the present invention provides a wide band erbium-doped fiber amplifier with a gain enhancement comprising a first fiber amplifier adapted to amplify C-band components of an input optical signal and a second fiber amplifier connected to the first fiber amplifier in series while being disposed downstream from the first fiber amplifier and adapted to amplify L-band components of the input optical signal. A C/L splitter is disposed between the first and second fiber amplifiers and adapted to split the amplified C and L-band optical signals to flow along different paths. A C/L combiner combines the amplified C-band optical signal split by the C/L splitter with the amplified L-band optical signal outputted from the second amplifier Re-using means for supplying a part of the amplified C-band optical signal split by the C/L splitter as a seed beam for the second fiber amplifier are provided. The preferred re-using means comprises a fiber grating exhibiting a variation in refractive index along a longitudinal fiber direction, and more preferably comprises a short-period fiber grating for a desired reflection function.

A fifth embodiment is similar to the third embodiment, differing from the third embodiment by using a reflection filter in place of the first and second 10% coupler.

In accordance with a sixth embodiment, the present invention provides a wide band erbium-doped fiber amplifier with a gain enhancement comprising a first fiber amplifier adapted to amplify C-band components of an input optical signal and a second fiber amplifier connected to the first fiber amplifier in series while being disposed downstream from the first fiber amplifier and adapted to amplify L-band components of the input optical signal. A C/L splitter is disposed between the first and second fiber amplifier and adapted to split the optical signal applied thereto, thereby causing the amplified C-band optical signal to flow along a path different from that of the optical signal applied to the C/L splitter. A reflection filter between the C/L splitter and the second fiber amplifier reflects on the C-band component of an ASE generated during an amplification operation of the second fiber amplifier, thereby supplying the reflected C-band optical signal as a seed beam for the second fiber amplifier. A C/L combiner combines the amplified C-band optical signal amplified by the first fiber amplifier with the amplified L-band optical signal outputted from the second amplifier re-using means for supplying a part of the amplified C-band optical signal split by the C/L splitter as a seed beam for the second fiber amplifier are provided. The preferred re-using means comprises a fiber grating exhibiting a variation in refractive index along a longitudinal fiber direction, and more preferably comprises a short-period fiber grating for a desired reflection function.

A seventh embodiment is similar to the sixth embodiment, differing from the sixth embodiment in that it uses first and second 10% couples in place of the reflection filter.

DETAILED DESCRIPTION OF THE PREFERRED EMBODIMENT

Figure 2:
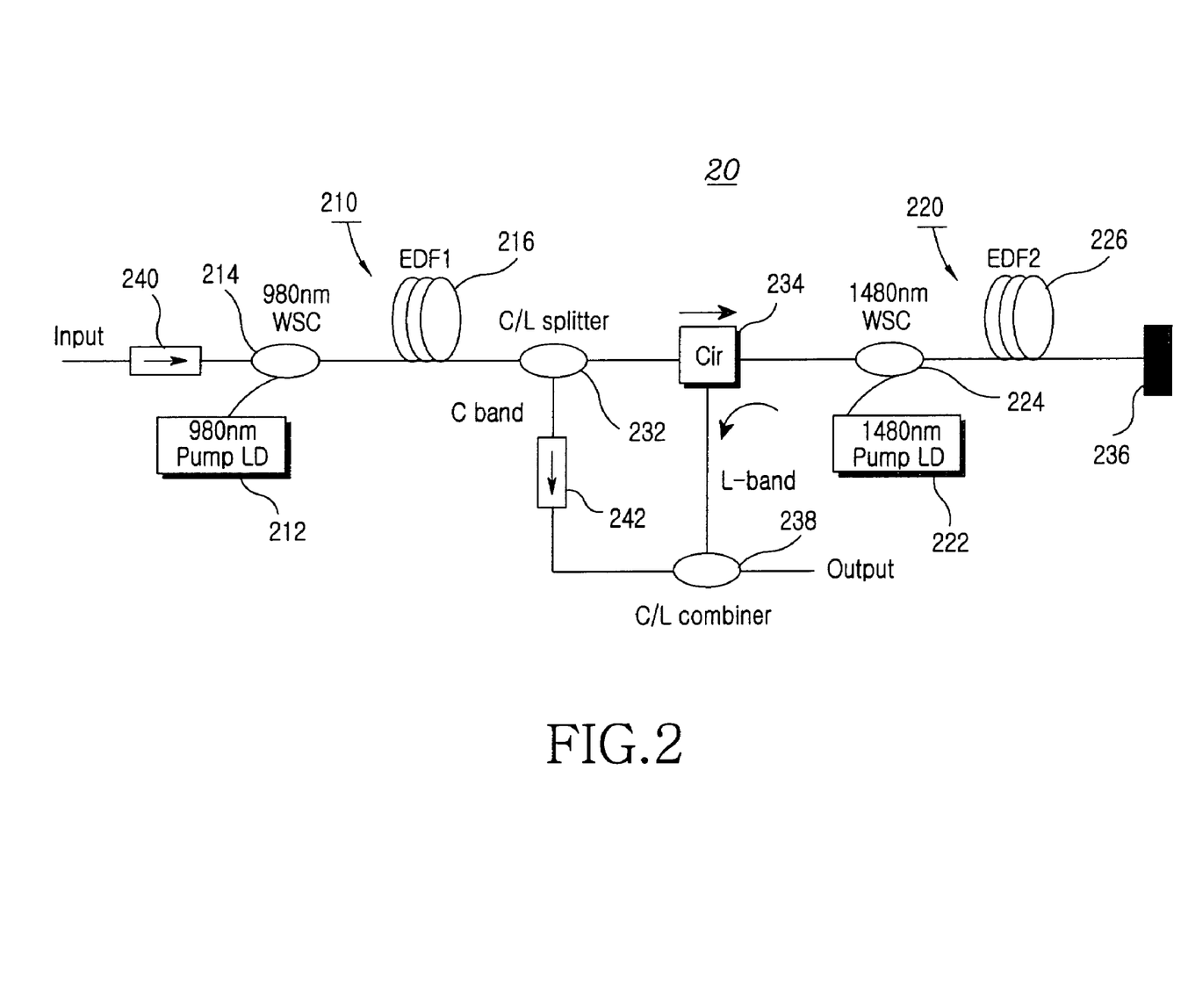
FIG. 2 illustrates a wide band erbium-doped fiber amplifier with a gain enhancement according to a first embodiment of the present invention.

FIG. 2 illustrates a wide band erbium-doped fiber amplifier with a gain enhancement according to a first embodiment of the present invention. As shown in FIG. 2, the gain-enhanced wide band erbium-doped fiber amplifier (hereinafter, simply referred to as a "fiber amplifier") 20 comprises a first and second fiber amplifier 210 and 220. The first fiber amplifier 210 comprises a first erbium-doped fiber 216 amplifies an input optical signal passing therethrough by a pumping light. The second fiber amplifier 220 comprises a second erbium-doped fiber 226 to amplify an input optical signal passing therethrough by a pumping light. In particular, the fiber amplifier 20 according to the first embodiment of the present invention includes a first erbium-doped fiber (EDF1) 216 having a desired length while serving to amplify an input optical signal by a 980 nm pumping light supplied from a 980 nm pumping laser diode 212 via a 980 nm wavelength selective coupler 214, and a second erbium-doped fiber (EDF2) 226 having a desired length while serving to amplify an input optical signal by a 1,480 nm pumping light supplied from a 1,480 nm pumping laser diode 222 via a 1,480 nm wavelength selective coupler 224.

The first erbium-doped fiber 216 amplifies C-band components of the input optical signal. The second erbium-doped fiber 226 is disposed downstream from the first erbium-doped fiber 216 while being connected to the first erbium-doped fiber 216 in series. The second erbium-doped fiber 226 amplifies L-band components of the input optical signal. The fiber amplifier 20 further comprises a C/L splitter 232 disposed between the first erbium-doped fiber 216 and the second erbium-doped fiber 226 to split the input optical signal into C and L-band components. A circulator 234 divides the amplified L-band optical signals to flow along two different paths. A fiber reflector 236 reflects the L-band optical signal amplified by the second erbium-doped fiber 226, and an ASE to flow backwards. A C/L combiner 238 combines the amplified C-band optical signal split by the C/L splitter 232 with the amplified L-band optical signal transmitted from the circulator 234, thereby providing a wide band optical signal. The fiber amplifier 20 also comprises a first isolator 240 for allowing the input optical signal to flow forwards while cutting off backward flowing of an ASE generated during the amplification procedure. The circulator 234 also serves to cut off backward flowing of an ASE generated in the second fiber amplifier 220 during the amplification procedure. A second isolator 242 is also provided in order to allow the C-band optical signal split by the C/L splitter 232 to flow forwards.

The above described "wide band" means a combination of the C-band and L-band bandwidths.

The C/L splitter 232 comprises three ports, that is, a port serving as an input terminal for receiving the C-band optical signal amplified by the first fiber amplifier 210 and the input optical signal, a port serving as an output terminal for the amplified C-band optical signal split by the C/L splitter 232, and a port serving as an output terminal for the components of the input optical signal other than C-band optical components. The circulator 234 comprises three ports, that is, a port serving as an input terminal for input optical signals, a port serving not only as an output terminal for input optical signals but also as an input terminal for backward amplified L-band optical signals, and a port serving as an output terminal used to combine the amplified L-band optical signals flowing backwardly from the reflector 236.

The C-band ranges from 1,530 nm to 1,560 nm, whereas the L-band ranges 1,570 nm to 1,610 nm. Such band ranges may be appropriately further determined in accordance with the design of the amplifier and the erbium-doped optical fiber employed.

The operation of the fiber amplifier 20 having the above-described configuration is now described.

In the wide band fiber amplifier 20, according to the present invention, a C-band optical signal is amplified while passing through the first erbium-doped fiber 216. An L-band optical signal is also subjected to an amplification procedure while passing through the second erbium-doped fiber 226. The first erbium-doped fiber 216 uses the 980 nm pumping laser diode 212 in a forward fashion, whereas the second erbium-doped fiber 226 uses the 1,480 nm pumping laser diode 222 in a forward fashion.

The first erbium-doped fiber 216 receives a pumping light of 980 nm from the 980 nm pumping laser diode 212 via the 980 nm wavelength selective coupler 214, thereby amplifying optical signals flowing forwards therethrough. In particular, the first erbium-doped fiber 216 amplifies a C-band optical signal by the 980 nm pumping light.

The optical signal amplified while passing through the first erbium-doped fiber 216 is split into C and L-band components by the C/L splitter 232. The L-band optical signal from the C/L splitter 232 is forwardly applied to the second erbium-doped fiber 226, whereas the C-band optical signal from the C/L splitter 232 is applied to the C/L combiner 238. The L-band optical signal emerging from the C/L splitter 232 is subjected to an amplification procedure while passing through the second erbium-doped fiber 226.

The L-band optical signal amplified in the second erbium-doped fiber 226 is subsequently reflected by the reflector 236, so that it is backwardly applied again to the second erbium-doped fiber 226. As a result, the L-band optical signal is re-amplified while passing through the second-erbium-doped fiber 226. The reflection of the amplified L-band optical signal by the reflector 236 is carried out in a full reflection fashion.

Preferably, the 980 nm pumping laser diode 212, which serves as a pumping light source for the first erbium-doped fiber 216, achieves a reduction in the noise figure of the amplifier. The 1,480 nm pumping laser diode 222, which serves as a pumping light source for the second erbium-doped fiber 226, achieves an enhancement in the output power of the amplifier. Preferably, the circulator 234 serves to prevent a reduction in the efficiency of the amplifier caused by backward flowing of an ASE generated during the amplification procedure carried out in the second erbium-doped fiber 226.

Figure 3:
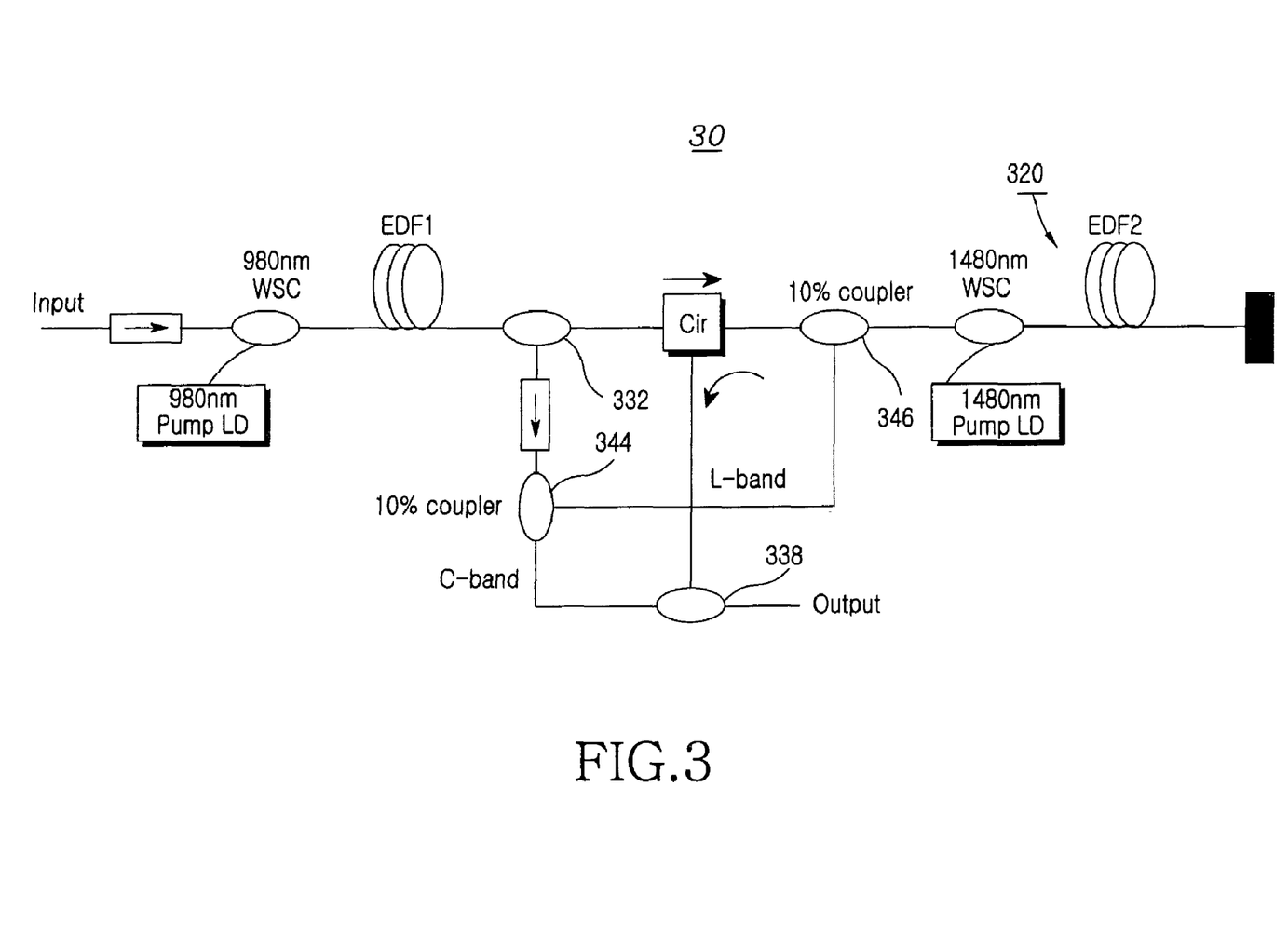
FIG. 3 illustrates a wide band erbium-doped fiber amplifier with a gain enhancement according to a second embodiment of the present invention.

FIG. 3 illustrates a wide band erbium-doped fiber amplifier with a gain enhancement according to a second embodiment of the present invention. The fiber amplifier 30, illustrated in FIG. 3, is similar to the gain-enhanced wide band erbium-doped fiber amplifier 20 shown in FIG. 2. Accordingly, only the difference between the fiber amplifiers will be described. No description is given for the configuration of the fiber amplifier of FIG. 3 that is identical to that of FIG. 2. The fiber amplifier 30 is different from the fiber amplifier 20 in that the amplified C-band optical signal split by the C/L splitter is partially applied again to the second fiber amplifier via 10% couplers. That is, the fiber amplifier 30 according to the second embodiment of the present invention is configured to connect 10% of the C-band optical signal, split by the C/L splitter 332 to the second fiber amplifier 320 via first and second 10% coupler 344 and 346. In accordance with this configuration, the 10% C-band optical signal applied to the second fiber amplifier 320 is used as a seed beam for the second fiber amplifier 320 so that it is re-used as a pumping light for the L-band optical signal. Thus, the amplification efficiency for the L-band optical signal is enhanced. The remaining configuration of the fiber amplifier 30 is identical to that of FIG. 2, so that no further description thereof is given.

Figure 4:
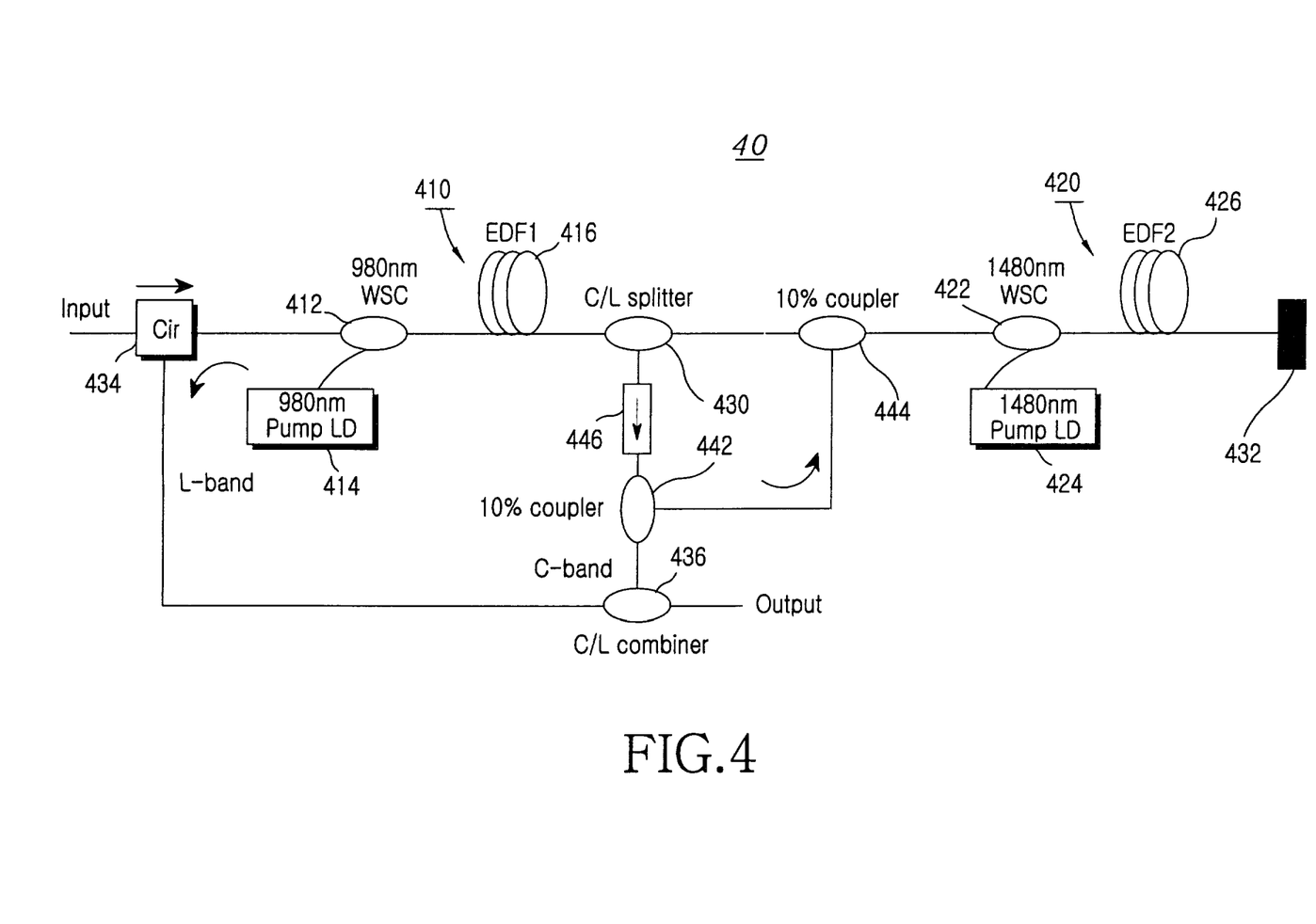
FIG. 4 illustrates a wide band erbium-doped fiber amplifier with a gain enhancement according to a third embodiment of the present invention.

FIG. 4 illustrates a wide band erbium-doped fiber amplifier with a gain enhancement according to a third embodiment of the present invention. This fiber amplifier 40, comprises a first fiber amplifier 410 to amplify the C-band component of an input optical signal, and a second fiber amplifier 420 connected to the first fiber amplifier 410 in series while being disposed downstream from the first fiber amplifier 410 to amplify the L-band component of the input optical signal. In accordance with the configuration according to the third embodiment of the present invention, the L-band optical signal is amplified two times while passing through the first and second fiber amplifiers 410 and 420 in a sequential fashion.

In detail, the fiber amplifier 40 comprises a first fiber amplifier 410 to amplify the C-band component of an input optical signal and a second fiber amplifier 420 connected to the first fiber amplifier 410 in series while being disposed downstream from the first fiber amplifier 410 to amplify the L-band component of the input optical signal. A C/L splitter 430 is disposed between the first and second fiber amplifiers 410 and 420 to split the optical signal applied thereto, thereby causing the amplified C-band optical signal to flow along a path different from that of the optical signal applied to the C/L splitter 430. A fiber reflector 432 is disposed downstream from the second fiber amplifier 420 to reflect the L-band optical signal amplified by the second fiber amplifier 420 to flow backwards A circulator 434 is disposed upstream from the first fiber amplifier 410 to guide the amplified L-band optical signal. A C/L combiner 436 combines the amplified C-band optical signal split by the C/L splitter 430 with the amplified L-band optical signal transmitted from the circulator 434, and to apply the resultant optical signal to an output stage, and a first and second coupler 442 and 444 to supply, as a seed beam for the second fiber amplifier 420, a part of the amplified C-band optical signal split by the C/L splitter 430.

The first fiber amplifier 410 comprises a first erbium-doped fiber 416 to amplify an input optical signal by a first pumping light supplied from a first pumping laser diode 414 connected to the first fiber amplifier 410 via a first wavelength selective coupler 412. The first pumping laser diode 414 supplies the first pumping light in a forward direction of the first fiber amplifier 410. The first wavelength selective coupler 412 comprises a 980 nm wavelength selective coupler, and the first pumping laser diode 414 comprises a 980 nm pumping laser diode.

The second fiber amplifier 420 comprises a second erbium-doped fiber 426 to amplify an L-band optical signal by a second pumping light supplied from a second pumping laser diode 424 connected to the second fiber amplifier 420 via a second wavelength selective coupler 422. The second pumping laser diode 424 supplies the second pumping light in a forward direction of the second fiber amplifier 420. The second wavelength selective coupler 422 comprises a 1,480 nm wavelength selective coupler, and the second pumping laser diode 424 comprises a 1,480 nm pumping laser diode.

The C/L splitter 430 splits the C-band optical signal amplified by the first fiber amplifier 410 to flow along a path different from that of the amplified input optical signal. The fiber reflector 432 is arranged downstream from the second fiber amplifier 420 to reflect the L-band optical signal amplified by the second fiber amplifier 420 to flow backwards toward the second fiber amplifier 420. The circulator 434 guides the amplified L-band optical signal, forced to flow backwards by the fiber reflector 432, toward the C/L combiner 436. In the C/L combiner 436, the amplified C-band optical signal split by the C/L splitter 430 is combined with the amplified L-band optical signal guided by the circulator 434. The combined optical signal is applied to the output stage.

Preferably, a part of the C-band optical signal split by the C/L splitter 430 is supplied as a seed beam for the second fiber amplifier 420 by the first and second coupler 442 and 444. The seed beam supplied by the first and second coupler 442 and 444 is used as a pumping light for the L-band optical signal in the second fiber amplifier 420. The first coupler 442 is disposed between the C/L splitter 430 and the C/L combiner 436, whereas the second coupler 444 is disposed between the C/L splitter 430 and the second fiber amplifier 420. Each of the first and second coupler 442 and 444 comprises a 10% coupler so as to use only 10% of the split amplified C-band optical signal as the seed beam for the second fiber amplifier 420.

Now, the operation of the fiber amplifier 40 having the above-described configuration is described. The C-band component of an input optical signal is amplified by the first fiber amplifier 410, and then split by the C/L splitter 430 to flow along a path different from that of the input optical signal. The L-band component of the input optical signal emerging from the C/L splitter 430 is subjected to an amplification procedure while passing through the second fiber amplifier 420.

At this time, 10% of the amplified C-band optical signal is supplied as a seed beam to the second fiber amplifier 420 by the first and second coupler 442 and 444. The supplied amplified C-band optical signal is re-used as a pumping light for L-band optical signals. The L-band optical signal amplified by the second fiber amplifier 420 is forced to flow backwards toward the second fiber amplifier 420 by the fiber reflector 432, so that it is subjected again to an amplification procedure. The backward L-band optical signal emerging from the second fiber amplifier 420 passes through the first fiber amplifier 410, and then flows toward the C/L combiner 436 in accordance with a guiding operation of the circulator 434. The amplified L-band optical signal and C-band optical signal are combined by the C/L combiner 436 which, in turn, outputs the combined optical signal to the output stage. In addition, an isolator 446 is disposed between the C/L splitter 430 and the C/L combiner 436, so as to make the amplified C-band optical signal flow forwards.

Figure 5:
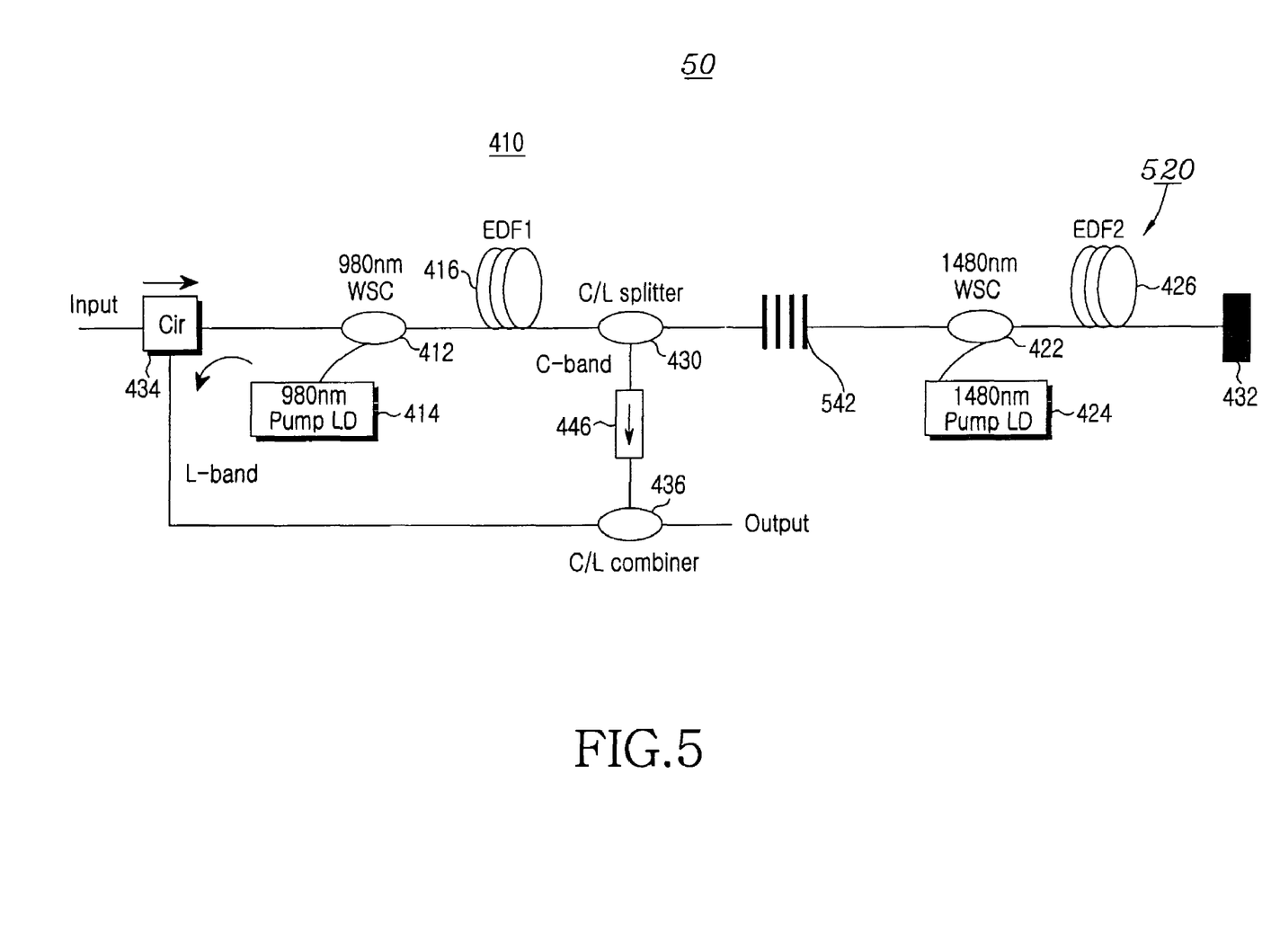
FIG. 5 illustrates a wide band erbium-doped fiber amplifier with a gain enhancement according to a fourth embodiment of the present invention.

FIG. 5 illustrates a wide band erbium-doped fiber amplifier with a gain enhancement according to a fourth embodiment of the present invention. The fiber amplifier 50 is similar to the gain-enhanced wide band erbium-doped fiber amplifier shown in FIG. 4. Accordingly, only the differences between the fiber amplifier of the third and fourth embodiments will be described and identical elements between the embodiments are labeled with identical numbers. No description will be given for the configuration of the fiber amplifier of FIG. 5 that is identical to that of FIG. 4. The fiber amplifier 50 of FIG. 5 is different from the fiber amplifier 40 of FIG. 4 in that it uses a reflection filter, preferably a fiber grating, and more preferably a short period fiber grating, in place of the first and second 10% coupler 442 and 444 used in the fiber amplifier 40. The remaining configuration of the fiber amplifier 50 is identical to that of the fiber amplifier 40 shown in FIG. 4, so that no further description thereof is given.

The reflection filter 542 of the fiber amplifier 50 reflects only the C-band component of an ASE generated during the amplification procedure for L-band optical signals in a second fiber amplifier 520, thereby causing the reflected C-band optical signal to be applied again to the second fiber amplifier 520. That is, the C-band optical signal of the ASE reflected by the reflection filter 542 is re-used as a seed beam for the second fiber amplifier 520, so that it serves as a desired pumping light. Thus, the L-band amplification efficiency of the second fiber amplifier 520 is enhanced as the seed beam is supplied by the reflection filter 542. The reflection filter 542, which serves to reflect the C-band component of the ASE, preferably comprises a fiber grating exhibiting a variation in refractive index along a longitudinal fiber direction, and more preferably comprises a short-period fiber grating for a desired reflection function.

Figure 6:
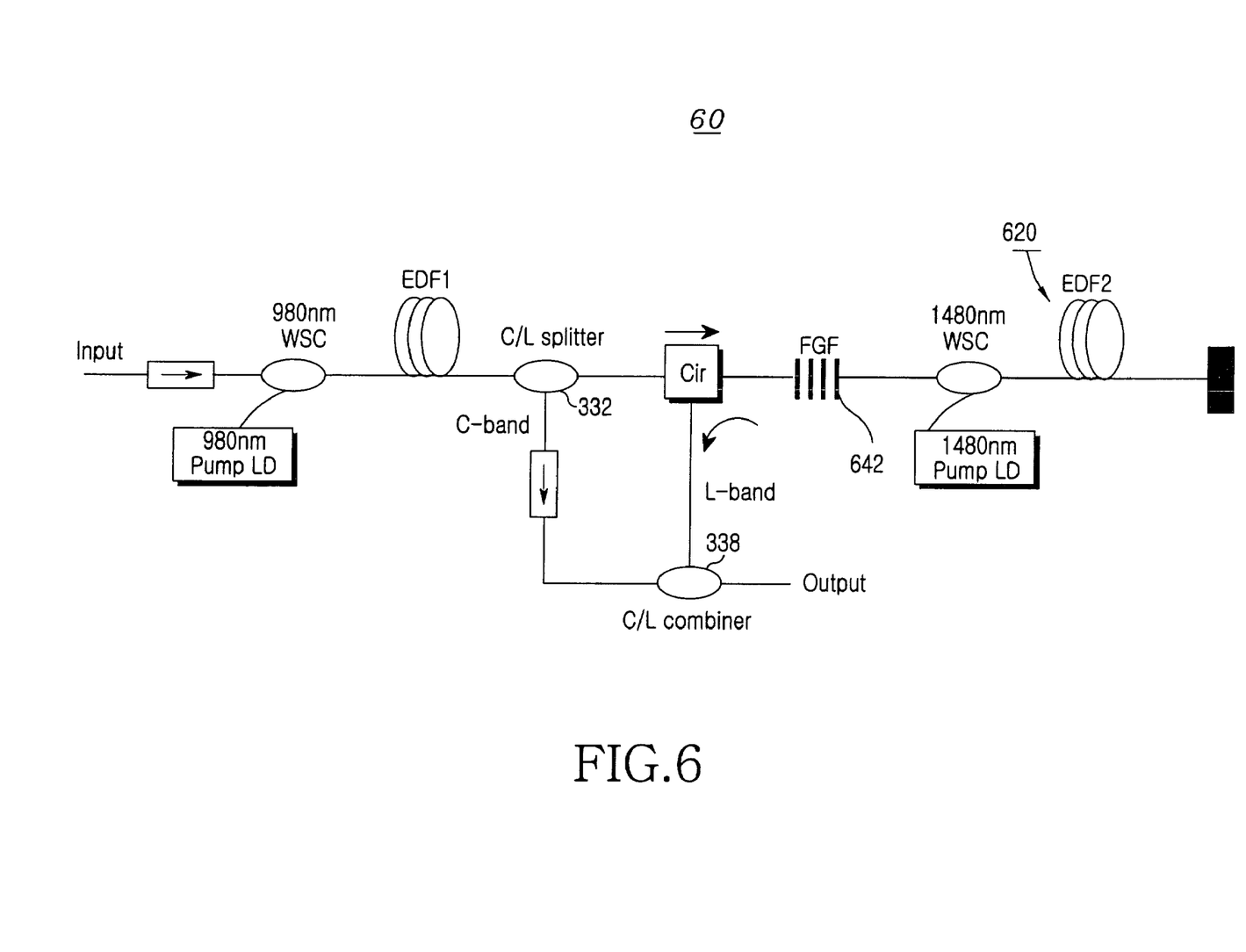
FIG. 6 illustrates a wide band erbium-doped fiber amplifier with a gain enhancement according to a fifth embodiment of the present invention.

FIG. 6 illustrates a wide band erbium-doped fiber amplifier with a gain enhancement according to a fifth embodiment of the present invention. This fiber amplifier, which is denoted by the reference numeral 60 in FIG. 6, is similar to the gain-enhanced wide band erbium-doped fiber amplifier 30 shown in FIG. 3. Accordingly, only the differences between the fiber amplifiers of the second and fifth embodiments are described and identical elements between the embodiments are labeled with identical numbers. No description will be given for the configuration of the fiber amplifier of FIG. 6 identical to that of FIG. 3. The fiber amplifier 60 of FIG. 6 is different from the fiber amplifier 30 of FIG. 3 in that it uses a reflection filter, preferably a fiber grating, and more preferably a short period fiber grating, in place of the first and second 10% coupler 344 and 346 used in the fiber amplifier 30. The remaining configuration of the fiber amplifier 60 is identical to that of the fiber amplifier 30 shown in FIG. 3, so that no further description thereof is given.

The reflection filter 642 of the fiber amplifier 60 reflects only the C-band component of an ASE generated during the amplification procedure for L-band optical signals in a second fiber amplifier 620, thereby causing the reflected C-band optical signal to be applied again to the second fiber amplifier 620. That is, the C-band optical signal of the ASE reflected by the reflection filter 642 is re-used as a seed beam for the second fiber amplifier 620, so that it serves as a desired pumping light. Thus, the L-band amplification efficiency of the second fiber amplifier 620 is enhanced as the seed beam is supplied by the reflection filter 642. The reflection filter 642, which serves to reflect the C-band component of the ASE, preferably comprises a fiber grating exhibiting a variation in refractive index along a longitudinal fiber direction, and more preferably comprises a short-period fiber grating for a desired reflection function.

Figure 7:
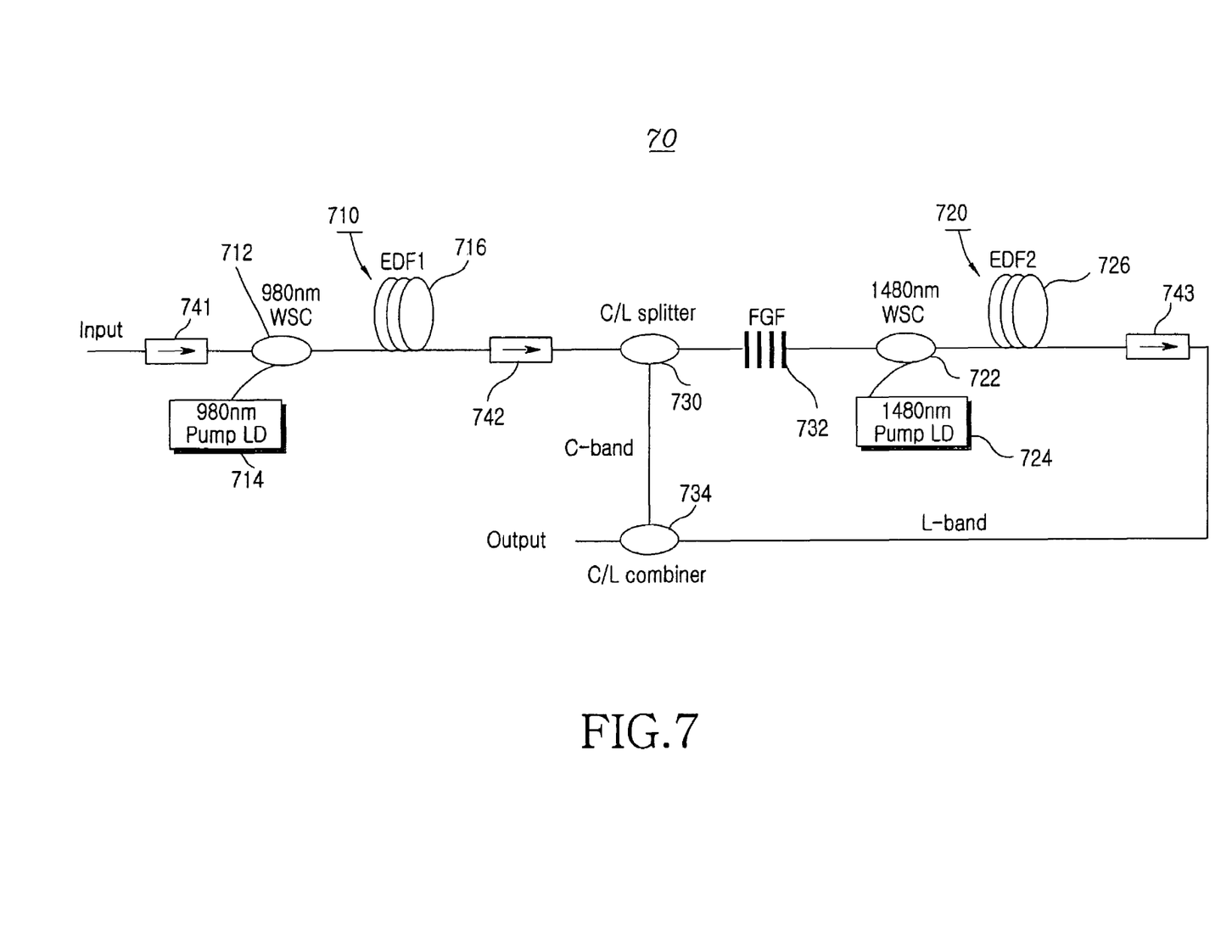
FIG. 7 illustrates a wide band erbium-doped fiber amplifier with a gain enhancement according to a sixth embodiment of the present invention.

FIG. 7 illustrates a wide band erbium-doped fiber amplifier with a gain enhancement according to a sixth embodiment of the present invention. As shown in FIG. 7, the fiber amplifier 70, comprises a first fiber amplifier 710 to amplify the C-band component of an input optical signal, a second fiber amplifier 720 connected to the first fiber amplifier 710 in series while being disposed downstream from the first fiber amplifier 710 to amplify the L-band component of the input optical signal. A C/L splitter 730 is disposed between the first and second fiber amplifiers 710 and 720 to split the optical signal applied thereto, thereby causing the amplified C-band optical signal to flow along a path different from that of the optical signal applied to the C/L splitter 430. A reflection filter 732 is disposed between the C/L splitter 730 and the second fiber amplifier 720 to reflect only the C-band component of an ASE generated during an amplification operation of the second fiber amplifier 720, thereby supplying the reflected C-band optical signal as a seed beam for the second fiber amplifier 720. A C/L combiner 734 combines the C-band optical signal amplified by the first fiber amplifier 710 with the L-band optical signal amplified by the second fiber amplifier 720 and to apply the resultant optical signal to an output stage. The "seed beam" means a C-band optical signal to be used as a pumping light for L-band optical signals.

The first fiber amplifier 710 comprises a first erbium-doped fiber 716 to amplify the C-band component of an input optical signal by a first pumping light supplied from a first pumping laser diode 714 via a first wavelength selective coupler 712. The first wavelength selective coupler 712 comprises a 980 nm wavelength selective coupler and the first pumping laser diode 714 comprises a 980 nm pumping laser diode. The second fiber amplifier 720 comprises a second erbium-doped fiber 726 to amplify an L-band optical signal by a second pumping light supplied from a second pumping laser diode 724 via a second wavelength selective coupler 722. The second wavelength selective coupler 722 comprises a 1,480 nm wavelength selective coupler, and the second pumping laser diode 724 comprises a 1,480 nm pumping laser diode.

An input optical signal, which is inputted to an input stage, passes through the first fiber amplifier 710. In the first amplifier 710, the C-band component of the input optical signal is amplified. The amplified C-band optical signal is split by the C/L splitter 730 to flow along a path different from that of the amplified input optical signal. The L-band optical signal split by the C/L splitter 730 is amplified by the second fiber amplifier 720 while passing through the second fiber amplifier 720. During the amplification operation of the second fiber amplifier 720, a backward ASE may be generated. This backward ASE is reflected by the reflection filter 732, so that it is supplied as a seed beam to the second fiber amplifier 720, thereby amplifying L-band optical signals. The amplified C-band optical signal split by the C/L splitter 730 is combined with the amplified L-band optical signal outputted from the second fiber amplifier 720. The combined optical signal is applied to the output stage. Preferably, a first isolator 741 is disposed upstream from the first fiber amplifier in order to cut off backward flowing of an ASE generated during the amplification operation of the first fiber amplifier 710. A second isolator 742 is also disposed between the first fiber amplifier 710 and the C/L splitter 730 in order to cause optical signals to flow forwards. A third isolator 743 is also disposed downstream from the second fiber amplifier 720 in order to cause amplified L-band optical signals to flow forwards.

Figure 8:
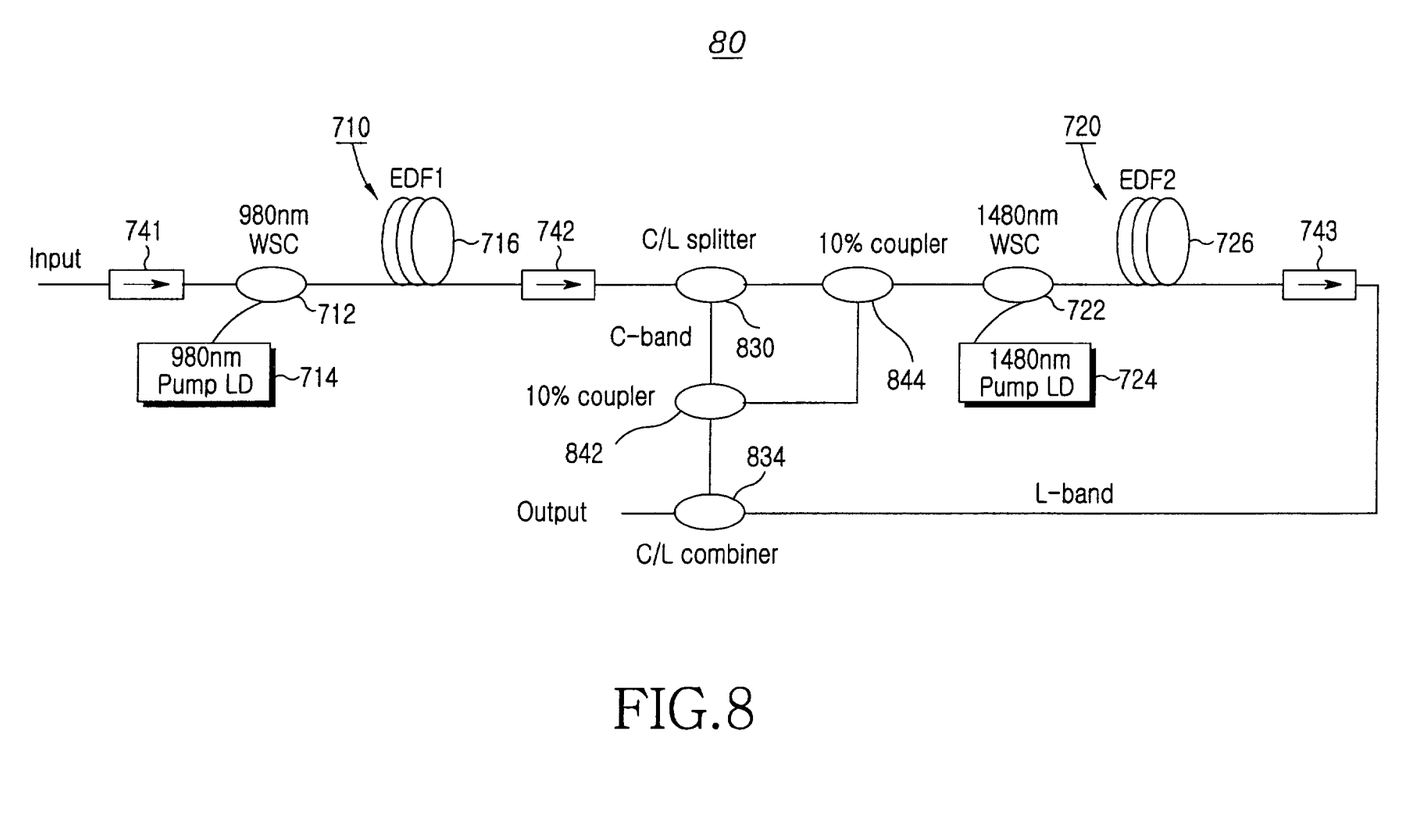
FIG. 8 illustrates a wide band erbium-doped fiber amplifier with a gain enhancement according to a seventh embodiment of the present invention.

FIG. 8 illustrates a wide band erbium-doped fiber amplifier with a gain enhancement according to a seventh embodiment of the present invention is illustrated. This fiber amplifier 80 is similar to the gain-enhanced wide band erbium-doped fiber amplifier 70 shown in FIG. 7. Accordingly, only the differences between the fiber amplifiers of the sixth and seventh embodiments are described and identical elements between the embodiments are labeled with identical numbers. No description is given for the configuration of the fiber amplifier of FIG. 8 identical to that of FIG. 7. The fiber amplifier 80 of FIG. 8 is different from the fiber amplifier 70 of FIG. 7 in that it uses first and second 10% coupler 842 and 844 in place of the reflection filter 732 used in the fiber amplifier 70. The remaining configuration of the fiber amplifier 80 is identical to that of the fiber amplifier 70 shown in FIG. 7, so that no further description thereof is given.

The first coupler 842 is disposed between a C/L splitter 730 and a C/L combiner 734, whereas the second coupler 844 is disposed between the C/L splitter 830 and a second fiber amplifier 820. In accordance with this configuration, a part of the C-band optical signal split by the C/L splitter 830 is supplied as a seed beam for the second fiber amplifier 820. In this case, each of the first and second coupler 842 and 844 uses 10% of the amplified C-band optical signal applied thereto.

As apparent from the above description, the present invention provides an erbium-doped fiber amplifier capable of coping with an expansion in bandwidth required in WDM optical communication systems, achieving an enhancement in gain, and particularly achieving a reduction in the length of an erbium-doped optical fiber used, thereby implementing an efficient and economical optical transmission system.

While this invention has been described in connection with what is presently considered to be the most practical and preferred embodiments, it is to be understood that the invention is not limited to the disclosed embodiment, but, on the contrary, it is intended to cover various modifications within the spirit and scope of the appended claims.

What is claimed is:

1. A wide band erbium-doped fiber amplifier with a gain enhancement comprising:
    a first fiber amplifier adapted to amplify C-band components of an input optical signal;
    a second fiber amplifier connected to the first fiber amplifier in series while being disposed downstream from the first fiber amplifier, and adapted to amplify L-band components of the input optical signal;
    a C/L splitter disposed between the first and second fiber amplifiers, and adapted to split the amplified C and L-band optical signals to flow along different paths;
    a fiber reflector disposed downstream from the second fiber amplifier, and adapted to reflect the amplified L-band optical signal to flow backwards toward the second fiber amplifier;
    a circulator disposed between the C/L splitter and the second fiber amplifier, and adapted to guide the amplified L-band optical signal, reflected to flow backwards by the fiber reflector, so that the amplified L-band optical signal flows along a path different from that of optical signals applied to the circulator; and
    a C/L combiner adapted to combine the amplified C-band optical signal split by the C/L splitter with the amplified L-band optical signal guided by the circulator, and to apply the resultant optical signal to an output stage.

2. The wide band erbium-doped fiber amplifier according to claim 1, wherein the first fiber amplifier comprises a first erbium-doped fiber connected to a 980 nm pumping laser diode via a first wavelength selective coupler, thereby receiving a pumping light from the 980 nm pumping laser diode.

3. The wide band erbium-doped fiber amplifier according to claim 1, wherein the second fiber amplifier comprises a second erbium-doped fiber connected to a 1,480 nm pumping laser diode via a second wavelength selective coupler, thereby receiving a pumping light from the 1,480 nm pumping laser diode.

4. The wide band erbium-doped fiber amplifier according to claim 1, wherein the circulator is configured to cut off backward flowing of an amplified spontaneous emission generated during an amplification operation of the second fiber amplifier.

5. The wide band erbium-doped fiber amplifier according to claim 1, further comprising an isolator disposed between the C/L splitter and the C/L combiner.

6. A wide band erbium-doped fiber amplifier with a gain enhancement comprising:
    a first fiber amplifier adapted to amplify C-band components of an input optical signal;
    a second fiber amplifier connected to the first fiber amplifier in series while being disposed downstream from the first fiber amplifier, and adapted to amplify L-band components of the input optical signal;
    a C/L splitter disposed between the first and second fiber amplifiers, and adapted to split the amplified C and L-band optical signals to flow along different paths;
    a fiber reflector disposed downstream from the second fiber amplifier, and adapted to reflect the amplified L-band optical signal to flow backwards toward the second fiber amplifier;
    a circulator disposed between the C/L splitter and the second fiber amplifier, and adapted to guide the amplified L-band optical signal, reflected to flow backwards by the fiber reflector, so that the amplified L-band optical signal flows along a path different from that of optical signals applied to the circulator;
    a C/L combiner adapted to combine the amplified C-band optical signal split by the C/L splitter with the amplified L-band optical signal guided by the circulator, and to apply the resultant optical signal to an output stage; and
    re-using means for supplying the amplified C-band optical signal split by the C/L splitter, as a seed beam for the second fiber amplifier.

7. The wide band erbium-doped fiber amplifier according to claim 6, wherein the re-using means comprises:
    a first coupler disposed between the C/L splitter and the C/L combiner, and adapted to partially couple the amplified C-band optical signal applied thereto; and
    a second coupler disposed between the circulator and the second fiber amplifier, and adapted to connect, to the second fiber amplifier, the amplified C-band optical signal partially coupled by the first coupler,
    whereby the amplified C-band optical signal is partially used as a seed beam for the second fiber amplifier.

8. The wide band erbium-doped fiber amplifier according to claim 7, wherein each of the first and second coupler uses 10% of the amplified C-band optical signal applied thereto.

9. The wide band erbium-doped fiber amplifier according to claim 6, wherein the re-using means comprises a reflection filter disposed between the C/L splitter and the second fiber amplifier, and adapted to reflect C-band components of an amplified spontaneous emission generated during an amplification of the second fiber amplifier.

10. The wide band erbium-doped fiber amplifier according to claim 9, wherein the reflection filter comprises a fiber grating having a variation in refractive index along a longitudinal fiber direction.

11. The wide band erbium-doped fiber amplifier according to claim 10, wherein the fiber grating is a short period fiber grating.

* * * * *